United States Patent [19]

MacDonald

[11] Patent Number: 5,269,010
[45] Date of Patent: Dec. 7, 1993

[54] MEMORY CONTROL FOR USE IN A MEMORY SYSTEM INCORPORATING A PLURALITY OF MEMORY BANKS

[75] Inventor: James MacDonald, Austin, Tex.

[73] Assignee: Advanced Micro Devices, Inc., Sunnyvale, Calif.

[21] Appl. No.: 576,699

[22] Filed: Aug. 31, 1990

[51] Int. Cl.⁵ .............................................. G06F 12/04
[52] U.S. Cl. .............................. 395/425; 364/DIG. 1; 364/243.1; 364/245.1; 364/245.31
[58] Field of Search ... 364/200 MS File, 900 MS File; 395/400, 425

[56] References Cited

U.S. PATENT DOCUMENTS

| | | | |
|---|---|---|---|
| 3,806,881 | 4/1974 | Miwa et al. | 395/400 |
| 4,025,903 | 5/1977 | Kaufman et al. | 395/425 |
| 4,571,676 | 2/1986 | Mantellina et al. | 395/425 |
| 4,860,252 | 8/1989 | Sykora | 395/425 |
| 4,908,789 | 3/1990 | Blokkum et al. | 395/425 |
| 4,926,314 | 5/1990 | Dhuey | 395/425 |
| 4,980,850 | 12/1990 | Morgan | 395/425 |
| 5,051,889 | 9/1991 | Fung et al. | 395/425 |
| 5,129,069 | 7/1992 | Helm et al. | 395/400 |

FOREIGN PATENT DOCUMENTS

| | | |
|---|---|---|
| 0285986 | 10/1988 | European Pat. Off. |
| WO88/09012 | 11/1988 | PCT Int'l Appl. |
| WO90/04576 | 5/1990 | PCT Int'l Appl. |

OTHER PUBLICATIONS

N. Margulis et al., *Design a DRAM Memory Bank For the 80386*, Electronic Design, 37:113-116 and 118-119 (1989).

A. Moorwood, *Finding Flexible Upgrade Paths for DRAM Board Design*, New Electronics, 19:36-37 (1986).

Primary Examiner—Joseph L. Dixon
Assistant Examiner—Hiep T. Nguyen
Attorney, Agent, or Firm—Foley & Lardner

[57] ABSTRACT

A memory control unit in a memory system including a plurality of memory banks generates row and column address and address strobe signals, on a cycle-by-cycle basis, responsive to a intermediate memory address and control signals provided by a memory bank comparator indicating whether a memory address is valid, which one of the memory banks is being addressed, the type of memory bank being addressed, and whether memory bank interleaving is possible. The memory control unit includes a row and column address assignor which provides the row and column addresses in response to the intermediate memory address and the memory bank comparator. A memory bank selector is also responsive to the intermediate memory address and the memory bank comparator to provide the row and column address strobe signals to the proper memory bank. A memory unit is arranged to permit the row and column address strobe signals to drive equal loads to preclude strobe signal timing skew and the need for external buffers.

4 Claims, 4 Drawing Sheets

MEMORY CONTROL FOR USE IN A MEMORY SYSTEM INCORPORATING A PLURALITY OF MEMORY BANKS

BACKGROUND OF THE INVENTION

The present invention generally relates to a memory control unit for use in a memory system of the type incorporating a plurality of memory banks. The present invention more particularly relates to such a memory control unit for use in a memory system including a plurality of dynamic random access memory (DRAM) banks and which includes a memory bank comparator which generates control signals responsive to an intermediate memory address to indicate, on a cycle-by-cycle basis, if the memory address is a valid address, which memory bank is being addressed, whether memory bank interleaving is possible, and what type of memory access cycle is required. The memory control unit, responsive to the memory bank comparator control signals and the intermediate memory address generates a row and column memory address, row and column address strobe signals and write-enable signals in properly timed relation to access the memory location in the proper memory bank.

The present invention is further directed to a memory unit for use with the memory control unit and which provides balanced row and column address strobe signal loads to preclude row and column address strobe signal timing skew.

Memory systems are well known in the art. Such systems are used in many applications including persona. computers. Memory systems provide program and operating data to associated central processing units to enable the central processing units to execute program instructions. In applications where a large amount of memory space is required, such as in personal computer applications, memory systems may include more than one memory bank. The memory banks may be formed with dynamic random access memories which are extremely popular in such applications because of their extremely high memory density. Each bank is divided into pages of, for example, 16KB pages. In this case, for example, a 256KB DRAM bank will include sixteen pages.

In order to access such memories, central processing units provide a multiple-bit address including a first portion containing an index into a 16KB memory page and a second portion which includes memory page pointers. In order to provide proper and organized memory utilization, the central processing unit memory address second portion pointers are translated by an address manager translation unit in accordance with stored translation parameters to provide an intermediate or translated address including the central processing unit memory address first portion which is not translated and a translated second portion which includes an address of the proper page to be accessed.

The translated address is then conveyed to a memory control unit which acts upon the translated address to derive a memory row and column address within the addressed page and row and column address strobe signals to be applied to the memory bank which includes the addressed page. In this manner, the available memory space is efficiently utilized and organized.

In a typical system, when a byte of data is to be stored, each memory bank is provided with the same memory address by the memory control unit. The particular memory location is selected with the application of the row address along with a row address strobe signal to the proper memory bank and then the column address along with a column strobe signal to the proper memory bank. A write-enable signal is then applied to each memory bank by the memory control unit which is maintained as the byte of data is conveyed from the memory control unit to each bank. Because only one bank is enabled by the strobe signals to receive the row and column address, the byte or word of data is stored within its own unique storage location.

Enhancements have been added to this general memory accessing procedure to improve upon memory access time. For example, a paging mode has been adopted wherein, instead of providing a newly generated row strobe signal during each cycle, the row strobe signal is maintained while new column addresses and column strobe signals are generated. The row strobe signal is maintained until a new row address is detected. This reduces addressing time and has been found to be advantageous since data is normally stored in multiple bytes with a given memory bank being accessed for a number of consecutive cycles.

Another enhancement has been the interleave mode. Interleaving is the practice of storing consecutive bytes of data in alternating or successive memory banks. This practice speeds up memory access because it counters the effect of row address strobe precharge. Hence, while a byte of data is stored in a memory bank, the row address strobe for the previous memory bank may be precharged fully and be ready for the next byte of data to be entered into that memory bank.

In addition to the foregoing, dynamic random access memories have been improved so that such devices are available in different types with each type corresponding to a respective different storage capacity. There are basically three different dynamic random access memory types, a 256KB type, a 1MB type, and a 4MB type. These different memory types afford flexibility to the ultimate user who may wish to tailor the storage size to a particular application or to increase the storage size of an existing system. Unfortunately, each memory type requires a different type of access cycle. This is mainly due to the need for a different number of address bits for each type. For example, the 256KB type requires nine row and nine column address bits, the 1MB type requires ten row and ten column address bits, and the 4MB type requires eleven row and eleven column address bits. Also, memory type is important from the aspect of interleaving, since interleaving is only possible between memory banks of the same type.

Hence, from the foregoing, it can be seen that multiple bank memory systems require a complex memory controller. One important aspect of such a memory controller is to determine which bank is to receive a byte of data. Another important aspect is to determine if interleaving is possible if interleaving is enabled. A still further aspect is to determine the type of memory bank in which the byte of data is to be stored to enable the selection of the proper cycle type. Lastly, it is important to be able to determine if the memory address is a valid address, in other words, if there is an available storage location in one of the memory banks corresponding to the memory address.

One disadvantage in the prior art has been that memory control units generally require the memory bank types and interleaving configuration to be determined at the time the system is configured. This places an extreme restriction on the flexibility of the system and does not permit memory bank interchanges after a system is configured. Also, although interleaving cycle type may be determined, such interleaving may not be possible under a given set of circumstances, such as, for example, when a memory bank to be interleaved is empty or not installed. This can result in a memory control unit losing data by attempting to store it where there are no memory devices.

In addition to the foregoing, multiple bank memory units generally include a pair of memories, an upper memory and a lower memory, within each bank. Each memory may be eight bits wide so that an eight-bit byte may be stored in one of the memories in parallel during a single access cycle or a sixteen-bit word may be stored in parallel during a single cycle with an eight-bit byte being stored in one memory and another eight-bit byte being stored in the other memory. The memories of the memory bank are generally arranged so that a separate row address strobe single is applied to the memories of each individual memory bank while a common upper column address strobe signal is applied to all upper memories and/or a common lower column address strobe signal is applied to all lower memories. A common write-enable signal is also applied to all of the memories. In this manner, a particular memory has been selected by the various combination of row and column address strobe signals.

The above-mentioned prior art memory selection arrangement has exhibited a serious disadvantage in row and column address strobe timing skew. This has resulted because this arrangement causes the row and column address strobes to drive different loads. Such timing skew has been overcome only by utilizing external and relatively high current buffers. Unfortunately, such buffers are expensive to implement and are slow in generating the row and column strobe signals which must be generated at a fast rate, sufficient to permit a central processing unit to execute instructions at a rate to support an entire system, such as a personal computer.

SUMMARY OF THE INVENTION

The invention provides a memory control unit for use in a memory system of the type including a plurality of memory banks, wherein the memory control unit is responsive to receiving an intermediate memory address for a byte of data to be stored for generating a memory location address and address strobe signals for enabling the byte of data to be stored in a selected one of the memory banks at the memory location. The memory control unit includes an input for receiving the intermediate address, and memory bank comparator means coupled to the input and responsive to the intermediate address for identifying a given one of the memory banks wherein the byte of data is to be stored. The memory control unit further includes address assigning means for generating a memory location address corresponding to the memory location within the given one of the memory banks wherein the byte of data is to be stored, and memory bank select means responsive to the memory bank comparator means for generating address strobe signals for the given one of the memory banks to enable the given one of the memory banks to store the byte of data within the assigned memory location.

The present invention further provides a memory unit for use in a memory system of the type which provides row and column addresses, row address strobe signals and column address strobe signals for addressing memory locations within the memory unit. The memory unit includes a plurality of memory banks, each memory bank including first and second memories, wherein each memory includes a set of address inputs for receiving the row and column addresses, a row address strobe input, and a column address strobe input. The address inputs of al of the memories are coupled together for receiving the row and column addresses in parallel, the row address strobe input of the first and second memories of each respective memory bank are coupled together to enable each memory bank to receive its own respective row address strobe signal when addressed, and wherein the column address strobe inputs of the first and second memories of each respective memory bank are coupled together to enable each memory bank to receive its own respective column address strobe signal when addressed.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements and wherein:

DETAILED DESCRIPTION OF THE PREFERRED EMBODIMENT

Figure 1:
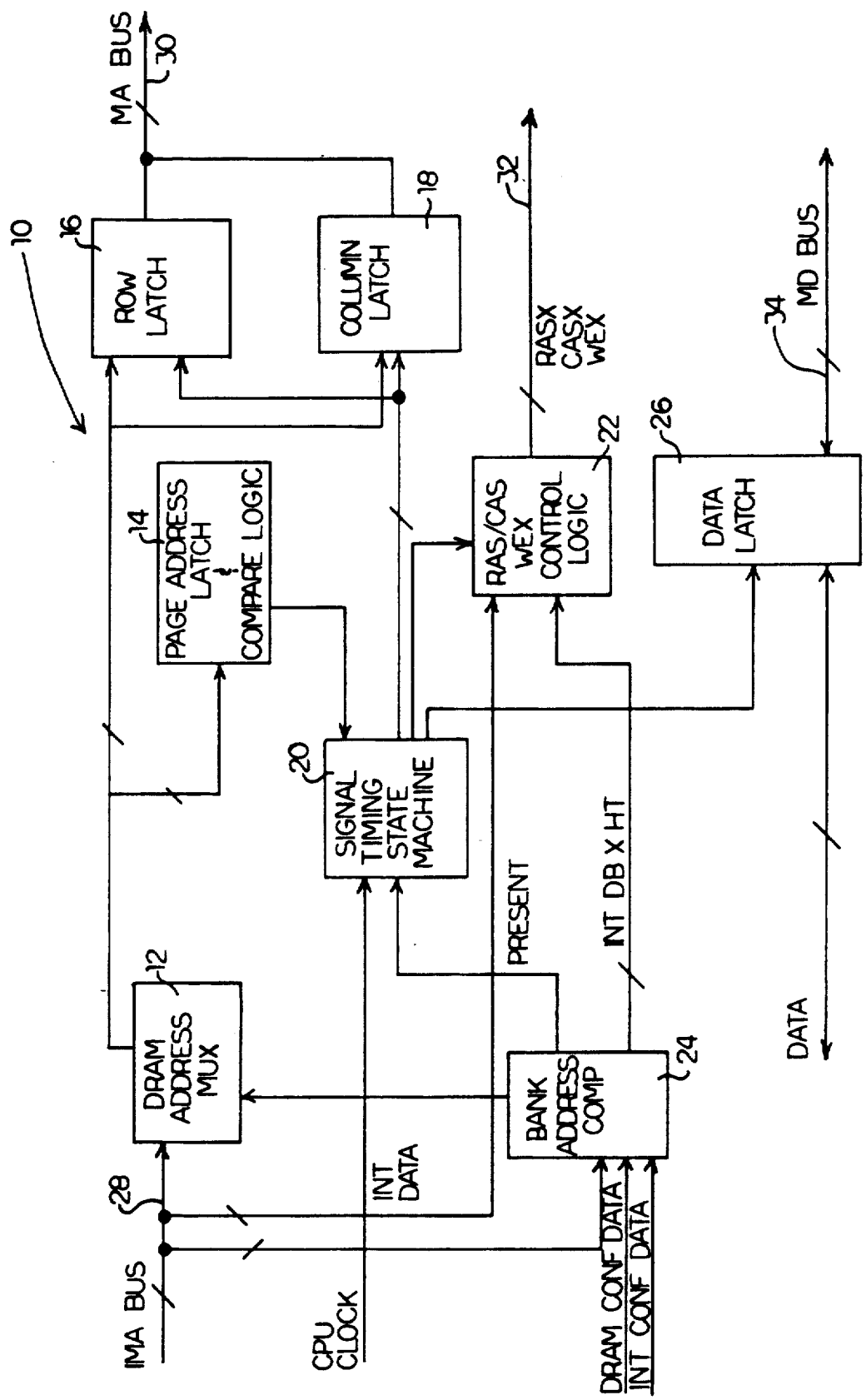
FIG. 1 is a detailed block diagram of a memory control unit embodying the present invention.

Referring now to FIG. 1, it illustrates, in block diagram form, a memory control unit 10 embodying the present invention. The memory control unit 10 is adapted for use in a memory system of the type which includes a plurality of memory banks. The memory banks are preferably dynamic random access memory (DRAM) banks with each bank including two memories with each memory being 8-bits wide so that an 8-bit byte may be stored in one of the memories during a single memory access cycle or a 16-bit byte may be stored in a memory bank during a single memory access cycle with an 8-bit byte being stored in one of the memories and another 8-bit byte being stored in the other memory. As will be seen hereinafter, the memory banks may include memories of different types wherein each type corresponds to a respective different number of memory byte locations available in the memories. For example, and in accordance with the preferred embodiment, the memories may be three different types; a 256KB type, a 1MB type, or a 4MB type. A preferred memory unit embodying the present invention which includes four memory banks will be described hereinafter with respect to FIG. 2.

The memory control unit 10 generally includes a DRAM address multiplexer 12, a page address latch and compare logic 14, a row address latch 16, and a column address latch 18. The memory control unit 10 further includes a signal timing state machine 20, strobe and write-enable signal control logic 22, a bank address comparator 24, and a data latch 26.

The memory control unit 10 is adapted to be coupled to an address manager which provides intermediate memory addresses to the DRAM address multiplexer 12 and the bank address comparator 24 over a multiple-bit parallel bus 28. The intermediate memory addresses may be an untranslated memory address originating from a central processing unit such as an 80286 central processing unit, or a translated address generated by an address translation unit (not shown) within the address manager. The multiple-bit translated or untranslated intermediate address, in accordance with a known manner includes a first portion which provides an index into a memory page and a second portion which includes a memory page address. As well known in the art, dynamic random access memories are generally divided into pages having a page size of $2^n$, where $n$ is the number of row address bits. As will be seen hereinafter, the memory control unit 10 is responsive to the multiple-bit intermediate memory address to provide row and column addresses identifying a memory location wherein a byte of data is to be stored and row and column strobe signals for selecting a particular memory bank in which the byte of data is to be stored at the assigned memory location. To that end, the memory control unit 10 includes a multiple-bit parallel memory address bus 30 for conveying the row and column addresses to the memory banks and a multiple-bit parallel strobe and write-enable bus 32 for conveying the row and column address strobe signals and the write-enable signals to the memory banks. The memory control unit 10 further includes a multiple-bit memory data bus 34 for conveying the bytes of data to the memory banks. As indicated in the Figure, the bus 34 is a bi-directional bus to permit bytes of data to be stored in the memory banks and to permit the bytes of data to be read from the memory banks.

The DRAM address multiplexer 12 is coupled to the row address latch 16 and the column address latch 18 wherein the row and column addresses assigned by the DRAM address multiplexer 12 are latched. The row and column latches 16 and 18 are coupled to the signal timing state machine 20 which causes the row and column latches to convey the row and column addresses to the memory banks in a properly timed sequence with the row and column address strobe signals.

The strobe and write-enable control logic 22 forms a memory bank select means which provides the row and column address strobe signals for selecting a particular memory bank wherein a byte of data is to be stored. The strobe and write-enable control logic 22 is also coupled to the signal timing state machine which causes the strobe and write-enable control logic 22 to provide the row and column address strobe signals in the proper sequence. The signal timing state machine is coupled to the central processing unit clock for receiving timing pulses therefrom and to the page address latch and compare logic 14. The page address latch and compare logic, when the page mode is enabled, compares the current row address to a previous row address. If the current row address is the same as the previous row address, the page address latch and compare logic will provide a page control signal to the signal timing state machine which then causes the latches 16 and 18 to only provide the column address from the latch 18 and the strobe and write-enable control logic 22 to provide only the column address strobe signal to implement the page mode.

The DRAM address multiplexer 12 and signal timing state machine 20 are both coupled to the bank address comparator 24. As will be seen hereinafter with respect to FIGS. 3 and 4, the bank address comparator 24 is responsive to the intermediate memory address, DRAM configuration data received from a configuration register, and interleave configuration data to derive control signals indicating whether the intermediate memory address is a valid address and that therefore there is a storage location within one of the memory banks in which the byte of data associated with the intermediate memory address may be stored, the type of memory bank in which the byte of data is to be stored, in which memory bank the data is to be stored, and whether interleaving is possible and if such interleaving is possible, whether the interleaving is to be a 2-way or 4-way interleaving.

The bank address comparator 24 provides the DRAM address multiplexer with memory bank type signals which inform the DRAM address multiplexer what type of DRAM is being addressed and therefore what type of access cycle is required and interleave control signals indicating whether the memory banks are to be interleaved and whether such interleaving is 2-way or 4-way interleaving.

The DRAM address multiplexer 12 utilizes the memory bank type signals provided by the bank address comparator 24 to determine the memory access cycle type required. For example, a 256KB memory requires a memory address which includes nine row address bits and nine column address bits. A 1MB memory, on the other hand, requires a memory address including 10 row address bits and 10 column address bits. A 4MB memory requires a memory address including 11 row address bits and 11 column address bits. Hence, in assigning the row and column addresses, the DRAM address multiplexer performs this function in response to both the intermediate memory address provided over bus 28 and the memory bank type signals provided by the bank address comparator 24.

The DRAM address multiplexer also is responsive to the interleave control signals provided by the bank address comparator. It utilizes these signals to generate the proper row and column addresses to permit interleaving between either two or all four of the memory banks.

The strobe and write-enable control logic 22 receives from the bank address comparator 24 a control signal which identifies a given one of the memory banks wherein the byte of data is to be stored. Responsive to this control signal, the strobe and write-enable control logic 22 generates the row and column address strobe signals for the selected memory bank to store the byte of data, to enable the selected memory bank to store the byte of data therein. The strobe and write-enable control logic 22 is also responsive to the interleave data provided by the bank address comparator 24 to generate the row and column address strobe signals. If, for example, interleaving is enabled, and 2-way interleaving is possible, the strobe and write-enable control logic 22 will then generate the row and column strobe signals for selecting the proper memory bank to implement the interleaving process. For example, and in accordance with this preferred embodiment, the first and second memory banks may be interleaved, the third and fourth memory banks may be interleaved, or all four memory banks may be interleaved. Such interleaving is possible if the memory banks to be interleaved are of the same type. Hence, if the first memory bank was accessed during the immediately preceding cycle, and if it is to be interleaved with the second memory bank, the strobe and write-enable control logic 2 responsive to the interleave data from the bank address comparator 24 will generate row and column strobe signals for the second memory bank during a current access cycle.

Lastly, the signal timing state machine 20 receives from the bank address comparator 24 a control signal indicating that the intermediate memory address is a valid address and that therefore an available storage location resides in one of the memory banks for storing the byte of data. This causes the signal timing state machine to implement its timers and to initiate the timing sequence for applying the row and column addresses, the row and column address strobe signals, and the write-enable signals to the memory banks.

In operation, when an intermediate address is received by the DRAM address multiplexer 12, which, as previously mentioned, forms an address assigning means for generating a memory location address corresponding to the memory location within the memory bank to be addressed, the DRAM address multiplexer 12 generates a row and column address having the proper number of bits responsive to the memory bank type signal received from the bank address comparator 24. The row address bits are latched in latch 16 and the column address bits are latched in latch 18.

The strobe and write-enable control logic 22 responsive to the bank address comparator 24 generates the row and column address strobe signals for the given one of the memory banks in which the byte of data is to be stored. It first generates a write-enable signal for the given memory bank under control of the signal timing state machine 20. The signal timing state machine then causes the latch 16 to convey the row address to the memory banks. During the duration of the row address bits, the strobe and write-enable control logic 22, under control of the signal timing state machine 20, provides the row address strobe signal to the given memory bank wherein the byte of data is to be stored so that its memory bank is enabled to receive the conveyed row address. Following the row address, the signal timing state machine causes the column address latch 18 to convey the column address to all of the memory banks. During the duration of the column address bits, the strobe and write-enable control logic 22 under control of the signal timing state machine 20, provides a column address strobe signal to the given memory bank to permit the given memory bank to receive the column address. During this time, the strobe and write-enable control logic 22, also under control of the signal timing state machine, provides the write-enable signal to the given memory bank in a manner to be described hereinafter and during the duration of the write-enable signal, the data latch 26 under the control of the signal timing state machine, conveys the byte of data stored therein over the memory data bus 34 to all of the memory banks. However, because only one memory bank has been enabled by the row and column strobe signals, only the given memory bank to store the byte of data will store the byte of data at the memory location corresponding to the row and column address provided by the row and column latches 16 and 18 and which were assigned by the DRAM address multiplexer 12.

If the page mode is enabled, the page address latch and compare logic 14 compares the current row address with a previous row address to determine if they are the same. If they are the same, the page address latch and compare logic 14 provides a page control signal to the signal timing state machine 20. In response to the page control signal, the signal timing state machine causes only the column latch 18 to convey a column address and the strobe and write-enable control logic 22 to provide only a column address strobe signal to the given memory bank. The previous row address strobe signal is also caused to remain active by the strobe and write-enable control logic 22.

If interleaving is enabled and possible as determined by the bank address comparator 24, the strobe and write enable control logic 22 will issue the proper row and column address strobe signals to implement interleaving of the memory banks.

Figure 2:
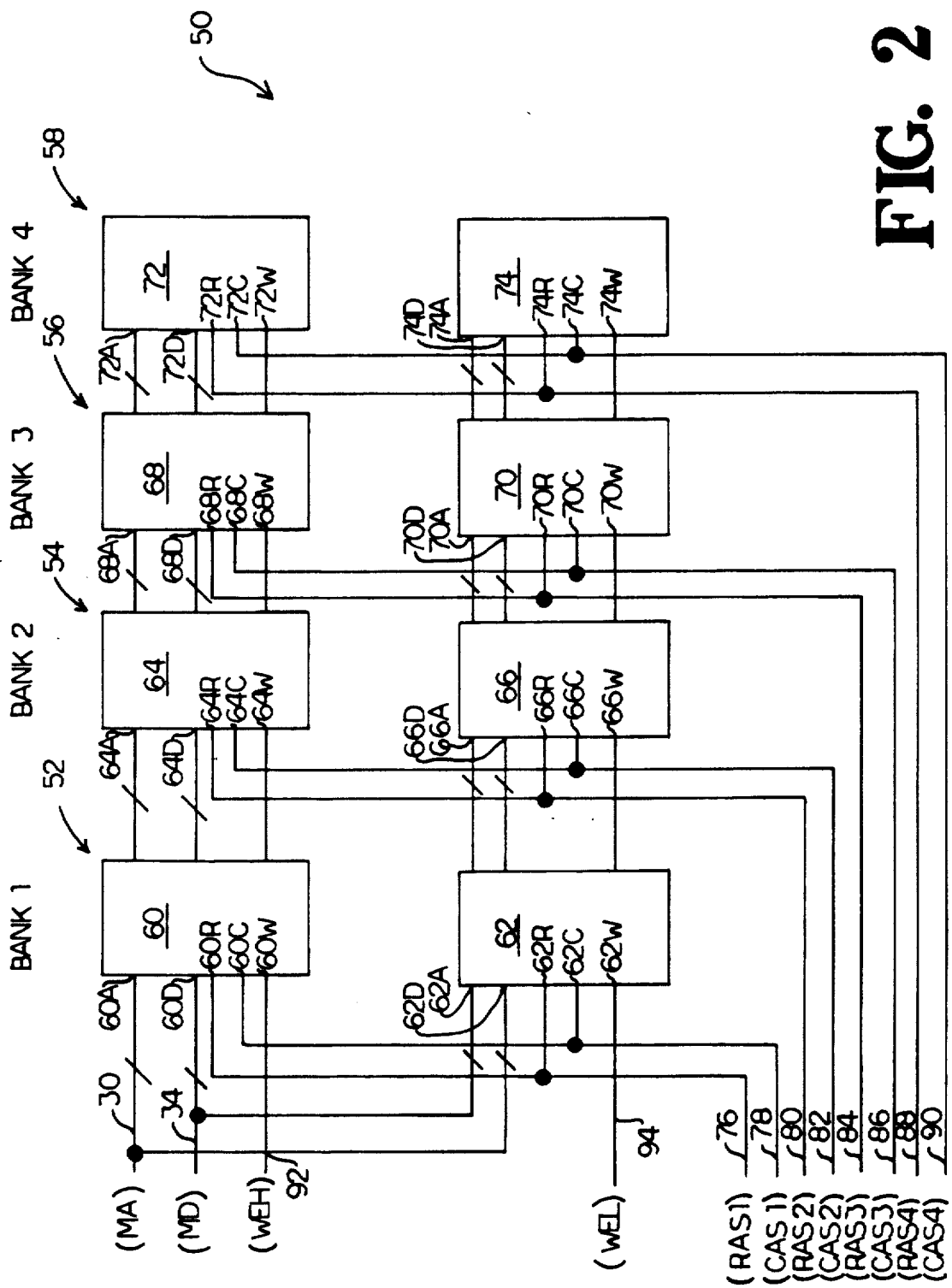
FIG. 2 is a detailed block diagram of a memory unit embodying the present invention.

Referring now to FIG. 2, it illustrates a memory unit 50 embodying the present invention and which, therefore, is particularly adapted for use with the memory control unit 10 of FIG. 1. The memory unit 50 includes a plurality of memory banks including a first memory bank 52, a second memory bank 54, a third memory bank 56, and a fourth memory bank 58. Each of the memory banks, 52, 54, 56 and 58 include first and second memories with memory bank 52 including an upper memory 60 and a lower memory 62, memory bank 54 including an upper memory 64 and a lower memory 66, memory bank 56 including an upper memory 68 and a lower memory 70, and memory bank 58 including an upper memory 72 and a lower memory 74. Each of the memories, 60, 62, 64, 66, 68, 70, 72 and 74 include a set of address inputs 60a, 62a, 64a, 66a, 68a, 70a, 72a and 74a, respectively. Each set of address inputs includes a plurality of inputs for receiving a respective bit of the memory row and column addresses received over the memory address bus 30. The respective address inputs of each of the memories are coupled together to enable each memory to receive the row and column address bits in parallel.

Each of the memories 60, 62, 64, 66, 68, 70, 72 and 74 also includes a set of data inputs 60d, 62d, 64d, 66d, 68d, 70d, 72d, and 74d for receiving the bytes of data to be stored which are conveyed from the memory control unit over the memory data bus 34. Each set of data inputs includes a plurality of inputs with the respective inputs of all of the memories being coupled together so that all of the memories receive the data bytes in parallel.

To permit selection of the individual memory banks by the row and column address strobe signals, each of the memory banks 60, 62, 64, 66, 68, 70, 72 and 74 includes a row address strobe input 60r, 62r, 64r, 66r, 68r, 70r, 72r and 74r, respectively, and a column address strobe input 60c, 62c, 64c, 66c, 68c, 70c, 72c and 74c, respectively. The strobe and write-enable multiple-bit bus 32 includes a plurality of conductors, each conductor being arranged to convey a respective different row and column address strobe signal. More specifically, conductor 76 is coupled to the row address strobe inputs 60r and 62r and conductor 78 is coupled to the column address strobe inputs 60c and 62c. Hence, over conductors 76 and 78, the row and column address strobe signals select the first memory bank 52. Similarly, conductor 80 is coupled to the row address strobe inputs 64r and 66r and conductor 82 is coupled to column address strobe inputs 64c and 66c for selecting the second memory bank 54. Conductor 84 is coupled to the row address strobe inputs 68r and 70r and conductor 86 is coupled to the column address strobe inputs 68c and 70c for selecting the third memory bank 56. Lastly, conductor 88 is coupled to the row address strobe inputs 72r and 74r and conductor 90 is coupled to the column address strobe inputs 72c and 74c for selecting the fourth memory bank 58. Hence, the row address strobe inputs of the upper and lower memories of each respective memory bank are coupled together to enable each memory bank to receive its own respective row address strobe signal when addressed and the column address strobe inputs of the first and second memories of each of the respective memory banks are coupled together to enable each memory bank to receive its own respective column address strobe signal when addressed.

Lastly, each of the memories 60, 62, 64, 66, 68, 70, 72 and 74 includes a write-enable input 60w, 62w, 64w, 66w, 68w, 70w, 72w and 74w. As can be noted in the Figure, the write-enable inputs of the upper memories 60, 64, 68 and 72 are all coupled together for receiving in parallel a write-enable signal from the memory control unit 10 over the write-enable bus 32 on bus conductor 92. Also, the write-enable inputs of each of the lower memories 62, 66, 70 and 74 are coupled together for receiving in parallel a lower write-enable signal from the memory control unit 10 over the strobe and write-enable bus 32 on conductor 94.

When a byte of data is to be stored within the memory unit 50, the row and column addresses are conveyed to all of the memories in parallel. However, because just one memory bank is selected by the row and column address strobe signals, only one memory bank will be enabled for storing the byte of data to be stored. Of particular importance is the fact that the row and column address strobe signals drive identical loads. This precludes the aforementioned skewing of the row and column address strobe signals which has been exhibited in prior art memory units and avoids the need for external buffers. The selection of a particular memory, if only one memory is accessed during a cycle, is obtained by the write-enable signals. For example, if only memory 60 is to receive a byte of data, its bank will be selected by the row and column address strobe signals provided over conductors 76 and 78, but only memory 60 will be selected by the write-enable signal over conductor 92 while its other memory 62 will not be selected due to the absence of a write-enable signal on conductor 94.

Figure 3:
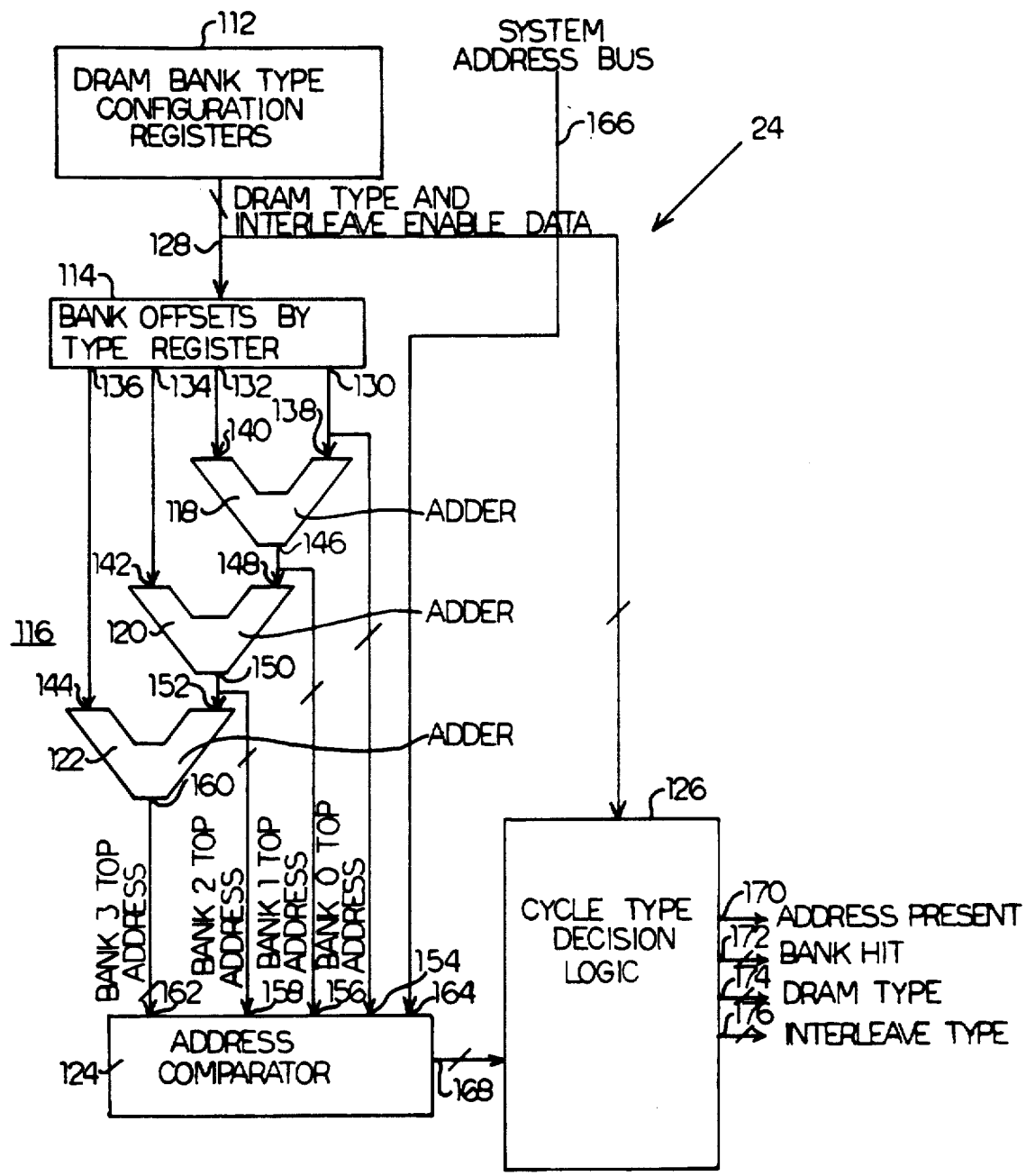
FIG. 3 is a detailed block diagram of the memory bank comparator of the memory control unit of FIG. 1.

Referring now to FIG. 3, it illustrates the memory bank comparator 24 of the memory control unit of FIG. 1. The memory bank comparator 24, in accordance with this preferred embodiment, is adapted for use with the memory unit 50 of FIG. 2 which includes the four dynamic random access memory banks 52, 54, 56 and 58.

The memory bank comparator 24 generally includes a DRAM bank-type configuration register 112, a bank offsets by type register 114, and adder 116, an address comparator 124, and a cycle-type decision logic 126. The adder 116 includes adders 118, 120 and 122.

The configuration register 112 is arranged to store two bits of data for each of the four memory banks 52, 54, 56 and 58 which indicate a particular type of DRAM memory bank used in the memory banks. As previously mentioned, the DRAM memory banks may be a 256KB type, a 1MB type, or a 4MB type. The configuration register 112 conveys the eight configuration bits over an 8-bit parallel bus 128 to the bank offsets by type register 114. The register 114 includes outputs 130, 132, 134 and 136. It assigns a factor for each of the memory bank types, wherein each factor corresponds to the maximum number of storage locations within each of the memory bank types. More specifically, the register 114 provides at its outputs 130, 132, 134 and 136 a 5-bit indication as to the maximum number of storage locations within the first, second, third and fourth memory banks respectively. The 5-bits provided at the outputs 130, 132, 134 and 136 are the most significant five bits representing the maximum number of storage locations within each of the memory banks.

The adder 116 adds the factors provided by the register 114 to provide a total sum and a partial or intermediate sum for each memory bank. The total sum corresponds to the total number of storage locations within the memory system memory banks. The partial or intermediate sum for each of the memory banks corresponds to the maximum number of storage locations within each respective memory bank plus the sum of the maximum number of storage locations of the memory banks which precede the respective memory bank. To that end, output 130 of register 114 is coupled to an input 138 of adder 118, output 132 is coupled to an input 140 of adder 118, output 134 is coupled to an input 142 of adder 120, and output 136 is coupled to an input 144 of adder 122. The output 146 of adder 118 is coupled to the input 148 of adder 120 and output 150 of adder 120 is coupled to input 152 of adder 122. Lastly, the output 130 of register 114 is also coupled to an input 154 of address comparator 124, the output 146 of adder 118 is coupled to an input 156 of address comparator 124, the output 150 of adder 120 is coupled to an input 158 of address comparator 124, and the output 160 of adder 122 is coupled to an input 162 of address comparator 124. Hence, the inputs 154, 156 and 158 of address comparator 124 are provided with the aforementioned partial or intermediate sums corresponding to the first memory bank 52, second memory bank 54, and third memory bank 56 and input 162 is provided with the total sum corresponding to the fourth memory bank 58 respectively.

The address comparator 124 includes a further input 164 which is coupled to the system address bus 166. The address comparator 124 at input 164 thus receives an intermediate memory address, for each memory access cycle over the system address bus 166. Preferably, the memory addresses are assigned so that each memory address is indicative of the total number of memory storage locations previously utilized within the memory system. The address comparator 124 compares the intermediate memory address received over bus 166 to each of the sums at its inputs 154, 156, 158 and 162 for providing, at output 168, 4-bit intermediate control signals indicating which ones of the memory banks have available storage locations for the byte of data to be stored. In accordance with this preferred embodiment, the sums at inputs 156, 158 and 162 are represented by six bits. The cycle type decision logic 126 is responsive to the address comparator 124 and the configuration register 112 for indicating at a single bit output 170 whether the memory address is valid, at a 4-bit output 172 which memory bank is being addressed, at a 3-bit output 174 what type of dynamic random access memory is being addressed, and a 3-bit output 176 if memory bank interleaving is possible and, if so, the type of interleaving which is possible.

Figure 4:
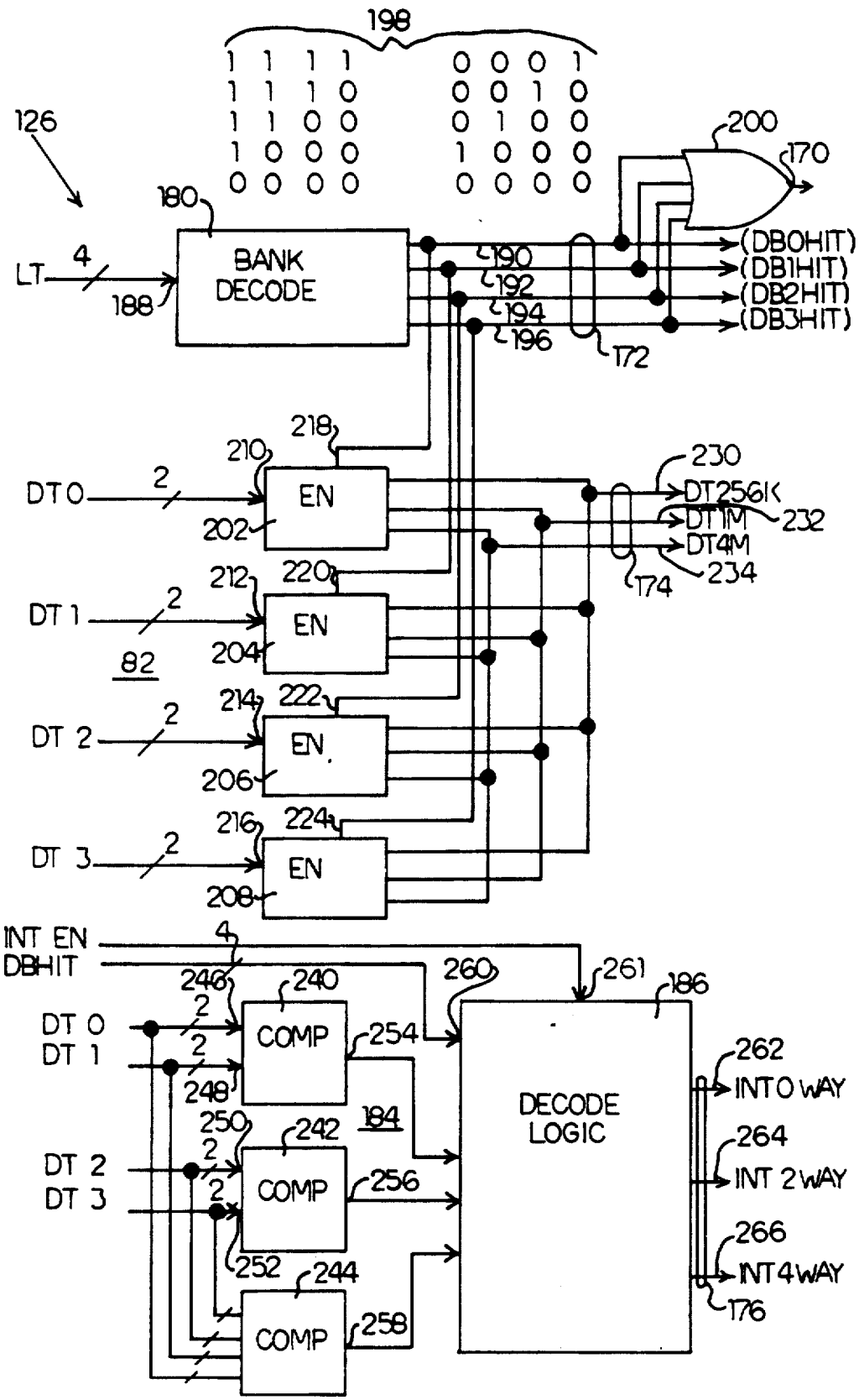
FIG. 4 is a detailed block diagram of the cycle type decision logic of the memory bank comparator of FIG. 3.

Referring now to FIG. 4, it illustrates in greater detail the cycle type decision logic 126 of FIG. 3. The cycle type decision logic 126 generally includes a memory bank decoder 180, a memory bank type decoder 182, a memory bank type comparator 184, and decode logic 186.

The bank decoder 180 includes a 4-bit input 188 which is coupled to the 4-bit output 168 of the address comparator 124. The four bits at input 188 are the intermediate control signals which represent the individual memory banks which have available storage locations for the byte of data to be stored. The bank decoder further includes four output lines 190, 192, 194 and 196 which form the output 172 of the cycle type decision logic 126. The truth table for the bank decoder 180 is indicated in the Figure by reference numeral 198.

As indicated by the truth table 198, if all four bits of the address comparator are logical ones, line 190 will have a logical one. If the first bit is zero and the last three bits are ones, line 192 will have a logical one. If the first two bits are zeros and the last two bits are ones, line 194 will have a logical one, and if the first three bits are zeros and the fourth bit is a one, line 196 will have a logical one. If all four bits of the address comparator are zeros, none of the lines 190, 192, 194 and 196 will have a logical one. As a result if the memory address is less than the first sum at input 154 of address comparator 124, the logical one on line 190 will indicate that the first memory bank is being addressed. If the memory address is less than the sum at input 156 but greater than the sum at input 154, the logical one on line 192 will indicate that the second memory bank is being addressed. If the memory address is less than the sum at input 158 but greater than the sum at input 156, the logical one on line 194 will indicate that the third memory bank is being addressed. If the memory address is less than the sum at input 162, but greater than the sum at input 158, the logical one on line 196 will indicate that the fourth memory bank is being addressed. Lastly, if the memory address is greater than the total sum at input 162, then the lack of a logical one on any of the lines, 190, 192, 194 and 196 will indicate that the address is an invalid address.

An OR gate 200 includes four inputs with each input being coupled to a respective given one of the lines 190, 192, 194 and 196. If any one of the lines 190, 192, 194 and 196 has a logical one, the OR gate 200 will provide at its output 170, which is the output 170 of the cycle type decision logic 126, a logical one indicating that the memory address is a valid address and that there is an available storage location within the memory system for the byte of data to be stored.

The memory bank type decoder 182 determines the type of memory bank in which the data byte is to be stored. The memory bank type decoder 182 includes selectors 202, 204, 206 and 208. Each of the selectors includes a 2-bit input, selector 202 having input 210, selector 204 having input 212, selector 206 having input 214 and selector 208 having input 216. The inputs 210, 212, 214 and 216 are coupled to the configuration register 112 with each input receiving a 2-bit indication as to the type of dynamic random access memory employed within its respective memory bank. The selectors 202, 204, 206 and 208 further each include an enable input 218, 220, 222 and 224 respectively, which are coupled to the lines 190, 192, 194 and 196 respectively.

Each of the selectors 202, 204, 206 and 208 also includes three outputs with each output corresponding to a respective different one of the dynamic random access memory types. The corresponding outputs are coupled together to form the DRAM type output 174 of the cycle type decision logic 126. The output 174 includes a first output line 230 corresponding to the 256KB memory type, output line 232 corresponding to the 1MB memory type, and output 234 corresponding to the 4MB memory type. When one of the output lines 190, 192, 194 and 196 of the bank decoder 180 is a logical one, its corresponding selector 202, 204, 206 and 208 will be enabled. The enabled selector, in response to the 2-bit memory type input, will provide a logical one at its output corresponding to the memory type indicated by the 2-bit input. For example, if output line 192 is high, indicating that the second memory bank is being addressed, selector 204 is enabled. If the 2-bit input 212 has a 2-bit input from the configuration register indicating that the second memory bank is a 1MB memory type, it will provide a logical one to output line 232 to thereby indicate that the addressed memory bank is a 1MB memory type. This information can then be utilized by the DRAM address multiplexer 12 of FIG. 1 to select the proper access cycle type for the 1MB memory within the second memory bank.

The memory bank type comparator 184 includes comparators 240, 242 and 244. Each of the comparators is coupled to the configuration register for receiving the 2-bit indication as to the type of memory which is employed in the respective memory banks. To that end, comparator 240 includes a 2-bit input 246 for receiving the 2-bit indication as to the type of memory in the first memory bank and a second 2-bit input 248 for receiving the 2-bit indication as to which type of memory is in the second memory bank. Similarly comparator 242 includes a first 2-bit input 250 for receiving the 2-bit indication as to the type of memory within the third memory bank and a second 2-bit input 252 for receiving the 2-bit indication of the type of memory within the fourth memory bank. Comparator 144 includes four 2-bit inputs for receiving the 2-bit indications as to the type of memory within the first, second, third and fourth memory banks.

As can be seen from the above, comparator 240 is arranged to determine if the first and second memory banks are of the same type, comparator 242 is arranged to determine if the third and fourth memory banks are of the same type, and comparator 244 is arranged to determine if all four of the memory banks are of the same type. If the first and second memory banks are of the same type, comparator 240 will provide at an output 254 a logical one, if the third and fourth memory banks are of the same type, comparator 242 will provide at an output 256 a logical one, and if all four memory banks are of the same type, comparator 244 will provide at an output 258 a logical one. The outputs 254, 256 and 258 of comparators 240, 242 and 244 respectively are coupled to the decode logic 186. The decode logic 186 is also coupled to the output lines 190, 192, 194 and 196 of the bank decoder 180 at a 4-bit input 260 and to an interleave enable at an input 261.

The decode logic further includes the output 176 of the cycle type decision logic 126 which includes output lines 262, 264 and 266. If two-way interleaving is possible, the decode logic will provide a logical one on output line 264. This indicates that either the firs+and second memory banks may be interleaved or the third and fourth memory banks may be interleaved. If the decode logic provides a logical one at output 266, this will indicate that all four memory banks may be interleaved. If the decode logic provides a logical one at output line 262, this will indicate that none of the memory banks may be interleaved. As previously mentioned, memory banks may only be interleaved if they include memories of the same type. In addition, in accordance with this preferred embodiment, only the first and second memory banks may be interleaved, the third and fourth banks may be interleaved, or all four memory banks may be interleaved together.

If interleaving is not enabled by the system configuration, the decode logic will receive a logical zero at its input 261 and provide a logical one at its output 262. If interleaving is enabled, the decode logic in response to the memory bank type comparator 184 will determine whether 2-way or 4-way interleaving is possible. For example, if output line 190 of the bank decoder is at a logical one indicating that the first memory bank is being addressed, and if comparator 240 determines that the first and second memory banks are of the same type, the decode logic will then provide a logical one at output 264 indicating that 2-way interleaving is possible. If, in this case, comparator 244 determines that all four of the memory banks include memories of the same type, it will provide a logical one at output 266 indicating that 4-way interleaving is possible. Hence, the memory bank comparator 24 operates on a cycle by cycle basis to provide the control signals indicating whether an intermediate memory address is a valid address, which memory bank is being addressed, what type of memory bank is being addressed, and whether interleaving is possible.

From the foregoing, it can be seen that the memory control unit of the present invention is arranged to accommodate system configuration changes automatically. Interleaving cycle type need not be set when the system is configured, and the memory system may be operated even with empty memory banks. In addition, the memory control unit of the present invention is arranged to select the memory banks in a manner such that the lower addresses are assigned to the lower number banks.

In addition, the memory control unit disallows illegal interleaving and thus prevents related system errors while optimizing performance based upon the DRAM types used in the memory banks. The improved memory unit also provides balanced row and column address strobe signal driving so that the memory control unit may be implemented in an integrated circuit without timing skew or external buffers.

While a particular embodiment of the present invention has been shown and described, modifications may be made, and it is therefore intended to cover in the appended claims all such changes and modifications which fall within the true spirit and scope of the invention.

What is claimed is:

1. A memory control unit for use in a memory system including a plurality of memory banks and responsive to receiving an intermediate memory address for a byte of data to be stored for generating a memory location address and address strobe signals for enabling said byte of data to be stored in a selected one of said memory banks at said memory location, said memory control unit comprising:

an input for receiving said intermediate address;

memory bank comparator means coupled to said input means and responsive to said intermediate address for generating a first control signal identifying a given one of said memory banks wherein said byte of data is to be stored and for generating a second control signal indicating that said intermediate address is a valid address;

timing control means coupled to the memory bank comparator means and responsive to said second control signal for generating timing signals;

address assigning means coupled to said input means and responsive to said intermediate address for generating a memory location address corresponding to the memory location within said given one of said memory banks wherein said byte of data is to be stored;

memory bank select means coupled to said timing means and to said memory bank comparator means for generating address strobe signals for said given one of said memory banks to enable said given one of said memory banks to store said byte of data within said assigned memory location in response to said timing signals and said first control signal;

wherein each of said memory banks is one of a plurality of different types, each of said type corresponding to a respective different number of storage locations, wherein said memory bank comparator means provides a memory bank type signal identifying the type of said given one of said memory banks, and wherein said address assigning means is coupled to said memory bank comparator means and is responsive to said memory bank type signal for generating said memory location address;

wherein said memory bank comparator means further provides interleave control signals, and wherein said address assigning means is also responsive to said interleave control signals for generating said memory location address;

wherein said address assigning means generates said memory location address including a row address and a column address;

further including latch means coupled to said address assigning means for latching said row and column addresses;

wherein said address strobe signals generated by said memory bank select means comprise row address and column address strobe signals; and wherein each of said memory banks include an upper memory and a lower memory, each of said memory including a set of address inputs, a row address strobe input, a column address strobe input, and a write-enable input, wherein said address inputs of all said memories are coupled together for receiving said row and column addresses in parallel, wherein said row address strobe inputs of said upper and lower memories of each respective memory bank are coupled together, wherein said column address strobe inputs of said upper and lower memories of each respective memory bank are coupled together, wherein said write-enable inputs of said upper memories are coupled together, and wherein said write-enable inputs of said lower memories are coupled together, and wherein said memory control unit further includes an address bus coupled to said address inputs, a row address strobe bus including a plurality of conductors, each said conductor being coupled to said row address strobe inputs of a respective given one of said memory banks, and a column address strobe bus including a plurality of conductors, each said conductor being coupled to said column address strobe inputs of a respective given one of said memory banks.

2. A memory unit for use in a memory system which provides row and column addresses, row address strobe signals and column address strobe signals for addressing memory locations within said memory unit, said memory unit comprising:

a plurality of memory banks, each of said memory banks including first and second memories, each of said first and second memories including a set of address inputs for receiving said row and column addresses, a row address strobe input, and a column address strobe input, wherein said address inputs of all said memories are coupled together for receiving said row and column addresses in parallel, wherein said row address strobe input of said first and second memories of each respective memory bank are coupled together to enable each memory bank to receive its own respective row address strobe signal when addressed, and wherein said column address strobe input of said first and second memories of each respective memory bank are coupled together to enable each memory bank to receive its own respective column address strobe signal when addressed.

3. A memory unit as defined in claim 1 wherein each of said first and second memories further includes a write-enable input, wherein said write-enable inputs of said first memories are coupled together and wherein said write-enable inputs of said second memories are coupled together.

4. A memory unit as defined in claim 3 wherein each of said first and second memories includes a set of data inputs and wherein said data inputs of all said memories are coupled together for receiving data in parallel.

* * * * *